(12) United States Patent
Blanchandin et al.

(10) Patent No.: US 8,000,577 B2
(45) Date of Patent: Aug. 16, 2011

(54) OPTICAL GUIDE INCLUDING NANOPARTICLES AND MANUFACTURING METHOD FOR A PREFORM INTENDED TO BE SHAPED INTO SUCH AN OPTICAL GUIDE

(75) Inventors: Stéphanie Blanchandin, Paris (FR); Christine Collet, Paris (FR); Alain Pastouret, Les Ulis (FR); Sophie De Monredon, Paris (FR); Jean-Pierre Jolivet, Paris (FR); Corinne Chaneac, Paris (FR)

(73) Assignee: Alcatel Lucent, Paris (FR)

( * ) Notice: Subject to any disclaimer, the term of this patent is extended or adjusted under 35 U.S.C. 154(b) by 539 days.

(21) Appl. No.: 12/063,950

(22) PCT Filed: Aug. 17, 2006

(86) PCT No.: PCT/FR2006/050802
§ 371 (c)(1),
(2), (4) Date: Jun. 22, 2008

(87) PCT Pub. No.: WO2007/020362
PCT Pub. Date: Feb. 22, 2007

(65) Prior Publication Data
US 2009/0116798 A1    May 7, 2009

(30) Foreign Application Priority Data
Aug. 17, 2005   (FR) ...................... 05 52520

(51) Int. Cl.
*G02B 6/00* (2006.01)
*C03B 37/075* (2006.01)
*C03C 13/00* (2006.01)

(52) U.S. Cl. .......................................... 385/142; 65/399
(58) Field of Classification Search .................. 385/142; 65/399
See application file for complete search history.

(56) References Cited

U.S. PATENT DOCUMENTS
2003/0087742 A1    5/2003  Taylor
2003/0175003 A1*   9/2003  Gasca et al. ................... 385/142

FOREIGN PATENT DOCUMENTS
WO    WO 01/99241 A2    12/2001
WO    WO 03/058776 A1   7/2003
WO    WO 03/079070 A2   9/2003

OTHER PUBLICATIONS

V. K.. Tikhomirov et al, "Fabrication and characterization of nanoscale, Er3+-doped, ultratransparent oxy-fluoride glass ceramics", Applied Physics Letters, AIP, American Institute of Physics, Melville, NY, US, vol. 81, No. 11, Sep. 9, 2002, pp. 1937-1939, XP012031866.

* cited by examiner

*Primary Examiner* — Uyen-Chau N Le
*Assistant Examiner* — Kajli Prince
(74) *Attorney, Agent, or Firm* — Harness, Dickey & Pierce

(57) ABSTRACT

The invention relates to an optical fiber comprising a gain medium which is equipped with: a core (22) which is formed from a transparent material and nanoparticles (24) comprising a doping element and at least one element for enhancing the use of said doping element; and an outer cladding (26) which surrounds the core. The invention is characterised in that the doping element is erbium (Er) and in that the enhancing element is selected from among antimony (Sb), bismuth (Bi) and a combination of antimony (Sb) and bismuth (Bi). According to the invention, one such fiber is characterised in that the size of the nanoparticles is variable and is between 1 and 500 nanometers inclusive, and preferably greater than 20 nm.

3 Claims, 2 Drawing Sheets

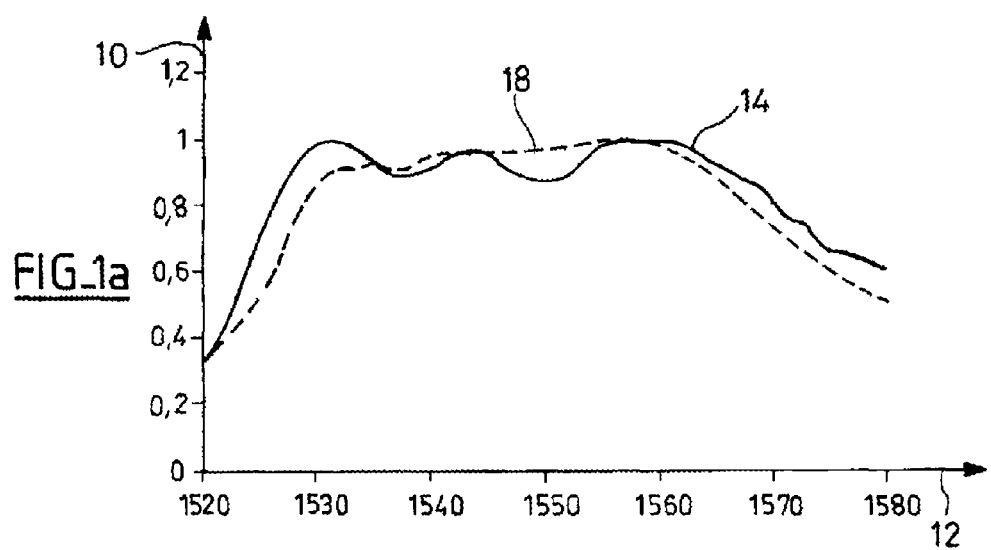
FIG_1a
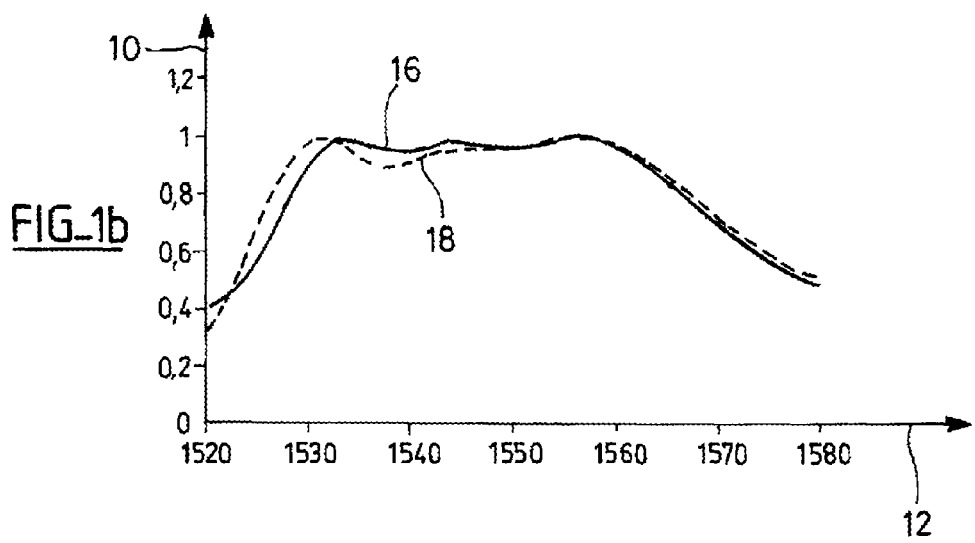
FIG_1b
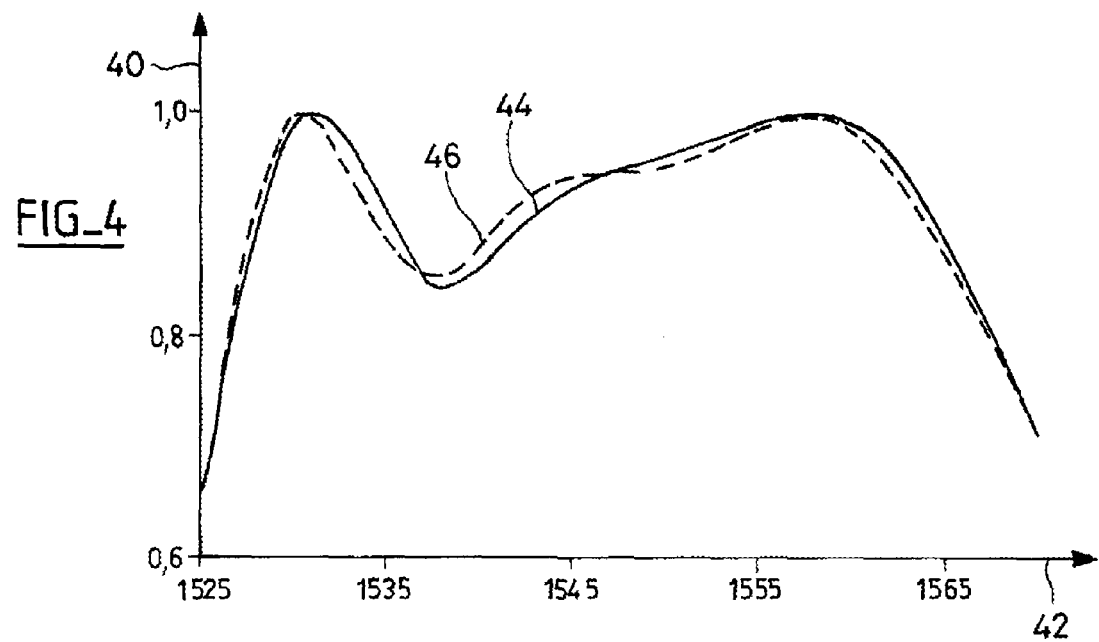
FIG_4

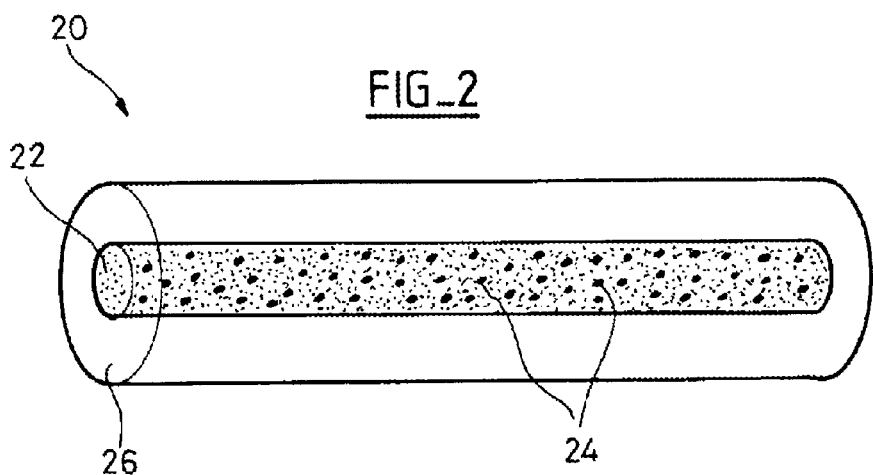
FIG_2
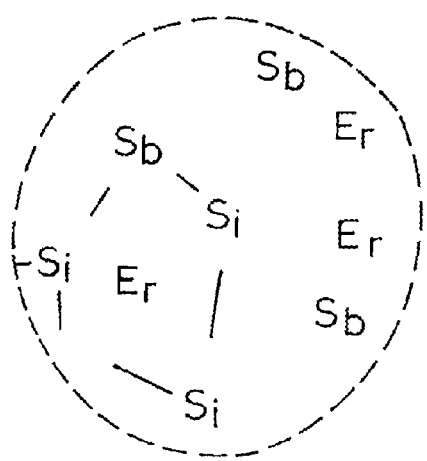
FIG_3a
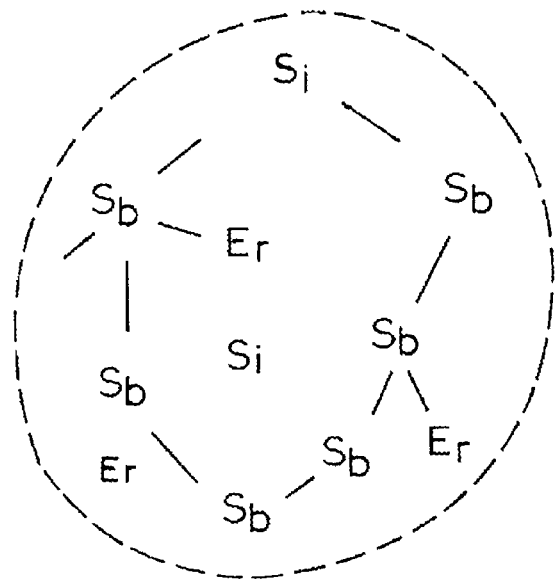
FIG_3b
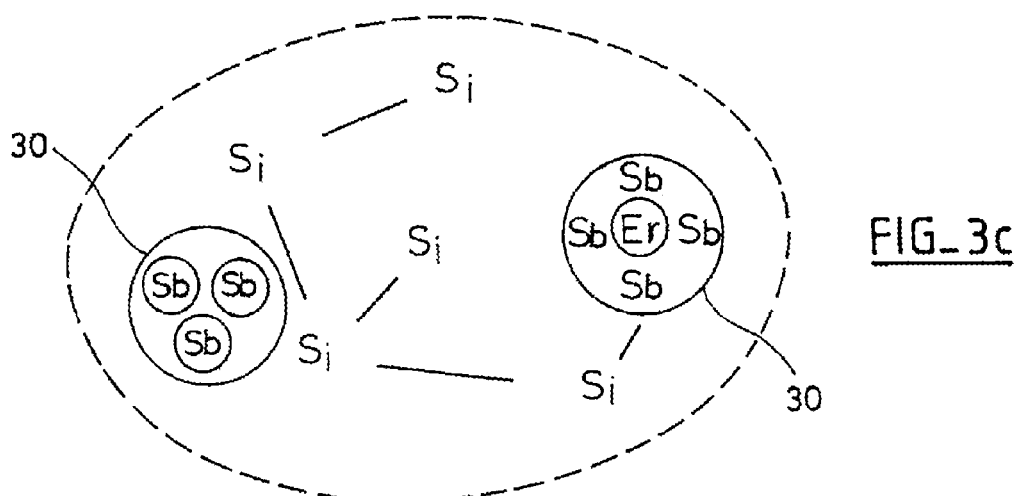
FIG_3c ately to the core of the preform intended to become a fibre, by using the MCVD method, for instance.

OPTICAL GUIDE INCLUDING NANOPARTICLES AND MANUFACTURING METHOD FOR A PREFORM INTENDED TO BE SHAPED INTO SUCH AN OPTICAL GUIDE

FIELD OF THE INVENTION

The present invention pertains to an optical guide, and in particular an optical fibre, that amplifies telecommunications signals, and a manufacturing method for a preform intended to be shaped into such an optical guide.

PRIOR ART

It is known in the art how to use an optical fibre comprising a gain medium to regenerate an optical signal received by that fibre and to retransmit the regenerated optical signal with increased intensity. To do so, such an amplifying fibre comprises:

- a core made up of a transparent material incorporating at least one doping element such as rare earth ions like erbium (Er) which amplify the optical signal, and
- a cladding surrounding the core, intended to keep the majority of the optical signal within the core.

Conventionally, incorporating doping elements and enhancement elements is done by impregnating porous glass with solutions that include these various doping agents in the form of dissolved salts. This method has the disadvantage of not allowing these elements to be incorporated in a satisfactory manner into the preform prior to the manufacture of a fibre when said manufacturing uses a method called MCVD, for Modified Chemical Vapour Deposition.

Indeed, the MCVD introduces high temperatures, which are incompatible with the high volatility of numerous elements and/or with the low stability of compounds created using these elements.

Another manufacturing method, termed "Multicomponent Oxide Glass" or MOG, is also used to incorporate new elements into a fibre.

However, the MOG method uses traditional glassmaking, mixing components in a crucible and exposing them to a high-temperature heat treatment that particularly has the disadvantage of requiring complicated and costly fibre production techniques.

Furthermore, the optical fibres produced using the MOG method have an optical signal attenuation rate higher than the attenuation rate for a fibre produced using the MCVD method, owing to the impurities introduced by crucible synthesis, and welding problems in relation to transmission fibres which are manufactured with the MCVD method.

An amplifying fibre is described, to give one example in patent application US2003/0,175,003, which discloses the use of nanoparticles smaller than 20 nm, which contain chemical elements in the vicinity of the doping element to improve signal amplification; said elements are hereafter termed enhancement elements.

This document also describes the organometallic synthesis of these nanoparticles and their insertion into the fibre core using an MCVD method.

SUMMARY OF THE INVENTION

The present invention includes the observation that there exists a need for a method for manufacturing amplifying fibres that makes it possible to insert enhancement elements in the vicinity of the doping element in order to maintain physical properties closes to those of a standard silica fibre, and thereby to make it easier to weld the standard fibre to the amplifying fibre manufactured in this manner.

The subject of this invention is an optical fibre comprising a gain medium equipped with a core (22) made up of a transparent material and of nanoparticles (24) which include a doping element and at least one element that enhances the use of said doping agent, and further of an outer cladding (26) surrounding the core, characterised in that the doping element is erbium (Er) et and that the enhancement element is chosen from among antimony (Sb), bismuth (Bi) and a combination of antimony (Sb) and bismuth (Bi).

An optical fibre created via the present invention uses new types of nanoparticles comprised of antimony and/or bismuth. It thereby benefits from the enhancing properties of bismuth and/or antimony when these elements are in the vicinity of erbium.

Furthermore, the relatively large size of these nanoparticles, which is between 1 and 500 nm inclusive and is preferably greater than 20 nm, makes it possible to incorporate them into the fibre and keep them in place, even when high temperatures are used to manufacture the guide, such as in an MCVD method.

In one embodiment, the doping element and/or the enhancement element is present in the form of an oxide. Thus, by creating the nanoparticle from one doping element and/or one oxidised enhancement element, the risks that the nanoparticle will be altered by oxidation of said elements are limited.

In one embodiment, the guide includes aluminium in the core, near the nanoparticles, with this inclusion enhancing the properties of the nanoparticles.

The invention also relates to a method for manufacturing a preform intended to generate an optical fibre that includes a core, made up of a transparent matrix and of nanoparticles that comprise a doping element and at least one element that enhances the use of said doping element, and an outer cladding surrounding the core, characterised in that:

the synthesis of nanoparticles is performed by the precipitation of at least one salt into a solution containing the enhancement element and/or the doping element; next, the nanoparticles thereby formed are introduced into the core of the preform by porous impregnation or modified chemical vapour deposition (MCVD).

Using the method of the invention, it is possible to manufacture nanoparticles with various compositions, which are sturdied when incorporated into a glass matrix, assuming that the doping elements and enhancement elements form nanoparticles with a relatively large structure and size, between 1 and 500 nm inclusive, and preferably greater than 20 nm, thereby making them less volatile and less sensitive to temperature than if said elements had been inserted using other methods.

Furthermore, the doping and/or enhancement elements are in the form of oxides so that they are less sensitive to the high temperatures that result from the steps that are specific to the MCVD method, which are used afterward to manufacture a preform and transform it into the fibre containing said nanoparticles.

In one embodiment, the precipitation of the nanoparticles is performed under soft chemistry conditions, particularly at ambient pressure. In other words, the experimental means required by the process are inexpensive.

In one embodiment, the precipitation is performed within a controlled-pH solution, such as one depending on the saturation thresholds of the various elements involved.

Finally, the invention also relates to an optical fibre including a core, made up of a transparent matrix and of nanoparticles that include a doping element and an element that enhances the use of said doping agent, as well as an outer cladding surrounding the core, created by producing the fibre from a manufactured preform using a method that complies with one of the preceding embodiments.

DESCRIPTION OF FIGURES

Other characteristics and benefits of the invention will become clear upon examining the description below, which is given for illustrative purposes and is non-limiting, of embodiments of the invention which make reference to the attached figures, in which:

FIGS. 1a and 1b, described above, are representative diagrams of the gain generated by fibres comprised of antimony or bismuth, FIG. 2 depicts an amplifying fibre that complies with the invention, FIGS. 3a, 3b and 3c are structural diagrams of various glasses created under various methods, and FIG. 4 is a representative diagram of the gain generated by an amplifying fibre that complies with the invention.

DETAILED DESCRIPTION OF THE INVENTION

Types of glass that include bismuth or antimony have particularly interesting characteristics described below with the help of FIGS. 1a and 1b, which represent amplification gains for materials comprising erbium as the doping element and antimony (FIG. 1a) or bismuth (FIG. 1b) as the enhancement element.

More precisely, these FIGS. 1a and 1b represent the material's amplification gain (y-axis 10) as a function of the wavelength of the amplified signal (x-axis 12) for fibres comprised of antimony (curve 14, FIG. 1a) or bismuth (curve 16, FIG. 1b), these gains being compared to those of a known fibre comprising aluminium as a doping agent (curve 18).

It thereupon becomes apparent that the respective properties of antimony (Sb) and bismuth (Bi) are interesting for processing an optical signal, to wit expanding the curve (Sb) of the gain medium's gain, or flattening said curve (Bi).

Thus, the usage of a filter intended to flatten the gain of a fibre is lower when the curve of the gain for that fibre is flattened. As this reduction may limit the pumping energy required by said fibre by about 25%, it becomes clear the operating cost of the fibre is significantly reduced.

Furthermore, simulations show that enlarging the gain band of an amplifying fibre by about 15.5% of the width of that band, which may in such a case be wider than 38 nm, as this width is required for certain telecommunications applications—1530 to 1568 nm FIG. 2 depicts an amplifying optical fibre 20 that complies with the invention. It has a core 22 comprised of nanoparticles 24 that has an doping element, such as erbium, surrounded by several enhancements elements such as bismuth and/or antimony.

In accordance with the invention, the fibre 20 was obtained through a fibre-manufacturing process involving a manufactured preform with the help of an MCVD (modified chemical vapour deposition) method, and makes it possible to incorporate said nanoparticles 24 into the core 22 by means of porous absorption.

At this point, it should be noted that the nanoparticles 24 withstand being incorporated into glass, as their size is relatively high, generally between 20 and 500 nm inclusive.

What's more, certain doping and/or enhancement elements are present in the nanoparticles in the form of oxides, which makes them less likely to be destroyed during the steps intended for manufacturing the preform and its transformation into an optical fibre.

These nanoparticles 24 may be generated using a method disclosed in the invention, i.e. by precipitating salts that include the doping and/or enhancement element(s) that are to be included in the nanoparticles.

In one example pertaining to the synthesis of nanoparticles comprising erbium (Er) as a doping element and antimony (Sb) as an enhancement element, precipitation makes it possible to obtain antimony nanoparticles, with the doping element erbium being incorporated afterward.

This operating mode uses an aqueous solution of potassium hexahydroxyantimonate (KSb(OH)6) which is added to water maintained at an acidic pH in order to obtain the precipitation of nanoparticles containing antimony.

The solution is then agitated at ambient temperature or at 95° C. for several days. Nanoparticles including antimony are finally obtained after centrifuging the solution, washing it, and drying it in an oven at 95° C.

Afterwards, said nanoparticles may incorporate erbium via an ionic exchange achieved using a solution that includes erbium chloride ErCl3 in an aqueous environment or with erbium acetylacetone Er(Acac)3 including water and an organic solvent.

After centrifuging and washing, the nanoparticles are then dispersed in a controlled-pH aqueous environment and introduced into the core of a preform creating with the help of modified chemical vapour deposition, or MCVD, by impregnating a layer of porous glass. This preform is then formed into fibres using a conventional heat treatment.

In a similar manner, nanoparticles containing bismuth (Bi) in the vicinity of erbium (Er) may also be prepared.

It should be noted that the precipitation method implemented by the invention is not suitable for precisely sensing the environment of the doping element (erbium in this example) with respect to enhancement elements, unlike finer nanoparticle synthesis methods, such as the organometallic synthesis described in the above-mentioned patent application.

An explanation pertaining to the structure of the nanoparticles generated with a method disclosed in the invention, is given with the help of FIGS. 3a, 3b and 3c for erbium/antimony doping.

FIG. 3a schematically depicts the type structure of a doped silicate glass SiO2 obtained using a conventional MCVD method, i.e. in which the doping agents are inserted in no particular arrangement in the form of dissolved chloride salts. In this structure, the doping element (Er) is surrounded by a heterogeneous and unorganised matrix of silicon, which may include the enhancement element (Sb). However, the majority of this enhancement element becomes volatile when exposed to high temperatures and/or is placed too far from the doping element to interact with it.

FIG. 3b schematically depicts a glass 105 obtained using the MOG method described above, with said glass appearing in the form of a statistical presence of the enhancement element (Sb) in the vicinity of the doping element (erbium), owing to the ability to incorporate a large proportion relative to the doping element.

Finally, FIG. 3c schematically depicts nanoparticles 30 obtained using the method disclosed in the invention. For clarity's sake, the doping element (Er) and the enhancement element (Sb) have been depicted as spheres, but it should be noted that, in experimental observations, these elements appear in nanoparticles in the form of oxides.

The method for manufacturing nanoparticles does not make it possible to fully control the structure and size of these particles. Notwithstanding the variations in the structures and sizes of the nanoparticles, their size may be relatively large, generally between 1 and 500 nm inclusive; the results of experiments show that the amplification gain of a fibre generated using a method discloses in the invention is very satisfactory, as shown below with the help of FIG. 4, which depicts the optical signal amplification gain curve (y-axis 40) as a function of the wavelength (x-axis 42) of said signal.

It becomes clear that a fibre with nanoparticles generating using a method disclosed in the invention (curve 46) may produce a gain over a broader range of wavelengths than the fibre manufactured using a conventional method and without a doping element.

The method of the present invention may be embodied in numerous different ways. In fact, synthesising nanoparticles through precipitation makes it possible to generate numerous types of nanoparticles based on various doping elements, such as erbium, and various enhancement elements, such as bismuth or antimony.

Additionally, a method disclosed in the invention may be implemented to manufacture nanoparticles using the same element as both a doping element and an enhancement element.

Furthermore, a method disclosed in the invention makes it possible to foresee synthesising nanoparticles that include various doping and/or enhancement elements, such as: Te, Ta, Zr, V, Pb, Nb, W, In, Ga, Sn, Mo, B, As, Ti.

Additionally, a fibre that complies with the invention may include, besides the nanoparticles, elements such as aluminium, which improve the fibre's gain.

Finally, it must be emphasised that there may be many applications for an amplifying fibre that complies with the invention. As an example, such a fibre may be implemented as a Raman amplification fibre, as a Raman laser fibre, as a highly non-linear fibre, as a saturable absorbent fibre and/or as a polarisable fibre.

The invention claimed is:

1. An optical fibre including a gain medium with a core made up of a transparent material and of nanoparticles comprising a doping element and at least one element that enhances the usage of said doping element, and of an outer cladding surrounding the core, wherein the doping element is erbium (Er), the enhancement element is chosen from among bismuth (Bi) and a combination of antimony (Sb) and of bismuth (Bi), and a size of the nanoparticles is greater than 20 nanometres.

2. An optical fibre according to claim 1, in which the doping element and/or the enhancement element appears in the form of oxides.

3. An optical fibre according to claim 1, comprising aluminium in its core, near the nanoparticles.

* * * * *